United States Patent
Kang et al.

(10) Patent No.: US 10,710,884 B2
(45) Date of Patent: Jul. 14, 2020

(54) METHOD OF PREPARING METAL OXIDE-SILICA COMPOSITE AEROGEL AND METAL OXIDE-SILICA COMPOSITE AEROGEL PREPARED THEREBY

(71) Applicant: LG CHEM, LTD., Seoul (KR)

(72) Inventors: Tae Gyeong Kang, Daejeon (KR); Jong Hun Kim, Daejeon (KR); Je Kyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 161 days.

(21) Appl. No.: 15/743,631

(22) PCT Filed: Dec. 13, 2016

(86) PCT No.: PCT/KR2016/014610
§ 371 (c)(1),
(2) Date: Jan. 10, 2018

(87) PCT Pub. No.: WO2017/105065
PCT Pub. Date: Jun. 22, 2017

(65) Prior Publication Data
US 2018/0194634 A1  Jul. 12, 2018

(30) Foreign Application Priority Data
Dec. 15, 2015 (KR) .......... 10-2015-0179462

(51) Int. Cl.
*C01B 33/158* (2006.01)
*C01F 5/02* (2006.01)
(Continued)

(52) U.S. Cl.
CPC ....... *C01B 33/1585* (2013.01); *B01J 13/0091* (2013.01); *C01B 33/158* (2013.01);
(Continued)

(58) Field of Classification Search
None
See application file for complete search history.

(56) References Cited

U.S. PATENT DOCUMENTS

| 3,131,072 A | 4/1964 | Taulli |
| 3,977,993 A | 8/1976 | Lynch |

(Continued)

FOREIGN PATENT DOCUMENTS

| CN | 102167337 | 8/2011 |
| CN | 102765724 | 11/2012 |

(Continued)

OTHER PUBLICATIONS

Dutoit et al., "Titania-Silica Mixed Oxides: I. Influence of Sol-Gel and Drying Conditions of Structural Properties," Journal of Catalysis 153: 165-176 (1995).

(Continued)

*Primary Examiner* — Anthony J Zimmer
(74) *Attorney, Agent, or Firm* — Dentons US LLP

(57) ABSTRACT

The present invention relates to a method of preparing a metal oxide-silica composite aerogel having a uniform particle size and excellent pore characteristics and a metal oxide-silica composite aerogel prepared thereby. The preparation method according to the present invention may not only have good economic efficiency because production costs are relatively reduced in comparison to the related art, but may also effectively prevent the collapse of a pore structure by suppressing a shrinkage phenomenon during drying. Thus, a metal oxide-silica composite aerogel prepared by the above preparation method may have higher specific surface area and better pore characteristics than a conventional metal oxide-silica composite aerogel prepared by oven drying while having low tap density.

9 Claims, 2 Drawing Sheets

(51) Int. Cl.
 *C01F 11/02* (2006.01)
 *B01J 13/00* (2006.01)
 *C01B 33/159* (2006.01)
(52) U.S. Cl.
 CPC .............. *C01B 33/159* (2013.01); *C01F 5/02* (2013.01); *C01F 11/02* (2013.01); *C01P 2004/61* (2013.01); *C01P 2006/11* (2013.01); *C01P 2006/12* (2013.01); *C01P 2006/16* (2013.01)

(56) References Cited

U.S. PATENT DOCUMENTS

| | | | |
|---|---|---|---|
| 4,954,327 A * | 9/1990 | Blount | C01B 33/1585 106/18.12 |
| 5,227,239 A * | 7/1993 | Upadhye | B01J 35/08 423/335 |
| 6,210,751 B1 | 4/2001 | Schwertfeger | |
| 2008/0034968 A1 | 2/2008 | Nordberg et al. | |
| 2009/0001014 A1 | 1/2009 | Hua et al. | |
| 2011/0000370 A1 | 1/2011 | Norberg et al. | |
| 2013/0106008 A1 | 5/2013 | Ahn et al. | |
| 2015/0225630 A1 | 8/2015 | Hosoi et al. | |
| 2016/0264427 A1 | 9/2016 | Oh et al. | |
| 2018/0127279 A1 | 5/2018 | Kim et al. | |
| 2018/0193825 A1 | 7/2018 | Kim et al. | |

FOREIGN PATENT DOCUMENTS

| | | |
|---|---|---|
| CN | 103204509 | 7/2013 |
| CN | 103214034 | 7/2013 |
| CN | 103285789 | 9/2013 |
| CN | 104941538 | 9/2015 |
| CN | 105016349 | 11/2015 |
| EP | 3216762 | 9/2017 |
| EP | 3305725 | 4/2018 |
| JP | 2014051643 | 3/2014 |
| KR | 10-0501758 | 10/2005 |
| KR | 10-2008-0084241 | 9/2008 |
| KR | 10-2008-0099819 | 11/2008 |
| KR | 10-2010-0051624 | 5/2010 |
| KR | 10-2010-0090989 | 8/2010 |
| KR | 10-2011-0064986 | 6/2011 |
| KR | 10-2012-0033159 | 4/2012 |
| KR | 10-2015-0003716 | 1/2015 |
| KR | 10-2015-0093123 | 8/2015 |
| WO | 2006071183 | 7/2006 |
| WO | 2015119430 | 8/2015 |

OTHER PUBLICATIONS

Sarawade et al., "Preparation of hydrophobic mesoporous silica powder with a high specific surface area by surface modification of a wet-gel slurry and spray-drying," Powder Technology 197: 288-294 (2010).

You Na Kim et al., "Sol-gel synthesis of sodium silicate and titanium oxychloride based $TiO_2$—$SiO_2$ aerogels and their photocatalytic property under UV irradiation," Chemical Engineering Journal 231: 502-511 (2013).

* cited by examiner

METHOD OF PREPARING METAL OXIDE-SILICA COMPOSITE AEROGEL AND METAL OXIDE-SILICA COMPOSITE AEROGEL PREPARED THEREBY

CROSS-REFERENCE TO RELATED APPLICATIONS

This application claims the benefit of Korean Patent Application No. 10-2015-0179462, filed on Dec. 15, 2015, in the Korean Intellectual Property Office, the disclosure of which is incorporated herein in its entirety by reference.

This application is a National Stage Application of International Application No. PCT/KR2016/014610 filed on Dec. 13, 2016, which claims priority to and the benefit of Korean Patent Application No. 10-2015-0179462, filed on Dec. 15, 2015, in the Korean Intellectual Property Office, both of which are incorporated herein in their entirety by reference for all purposes as if fully set forth herein.

TECHNICAL FIELD

The present invention relates to a method of preparing a metal oxide-silica composite aerogel having a uniform particle size and excellent pore characteristics and a metal oxide-silica composite aerogel prepared thereby.

BACKGROUND ART

Since a silica aerogel, as a high specific area, ultra-porous material having a porosity of about 90% to 99.9% and a pore diameter of about 1 nm to 100 nm, has excellent characteristics such as ultra lightweightness, ultra insulation, and ultra-low dielectric constant, research into the applications of the aerogel as a transparent insulator and an environmentally-friendly high-temperature insulator, an ultra-low dielectric thin film for a highly integrated device, a catalyst and a catalyst support, an electrode for a supercapacitor, and an electrode material for desalination as well as the development of an aerogel material has been actively conducted.

The biggest advantage of the silica aerogel is super-insulation having a thermal conductivity of 0.300 W/m·K or less which is lower than that of a typical organic insulation material such as a Styrofoam. Also, the aerogel may address fire vulnerability and generation of toxic gas in case of fire, i.e., fatal weaknesses of a typical organic insulation material.

In order to prevent structural collapse due to a shrinkage phenomenon occurred during drying, the silica aerogel is prepared by a method in which a hydrophobic silica aerogel is prepared and a surface modifier is then removed by pyrolysis.

Specifically, the silica aerogel is prepared by the steps of: preparing a silica sol by hydrolysis of tetra ethyl ortho silicate (TEOS) or water glass with an acid catalyst, adding a basic catalyst thereto, and performing a condensation reaction to prepare a hydrophilic wet gel (first step); aging the wet gel (second step); performing solvent substitution in which the aged wet gel is put in an organic solvent to substitute water present in the wet gel with an organic solvent (third step); preparing a hydrophobic wet gel by adding a surface modifier to the solvent-substituted wet gel and performing a modification reaction for a long period of time (fourth step); preparing a hydrophobic silica aerogel by washing and drying the hydrophobic wet gel (fifth step); and pyrolyzing the aerogel (sixth step).

Recently, in order to further extend applications of silica aerogel, a plan of improving mechanical properties in addition to original properties of the silica aerogel has been reviewed, and, for example, a metal oxide-silica composite aerogel, in which a metal oxide is introduced, is being developed.

In general, the metal oxide-silica composite aerogel is being prepared by the steps of: adding a metal ion solution and an acid catalyst to a water glass solution and performing a reaction to prepare a metal oxide-silica composite wet gel (step 1); and washing and oven drying the wet gel (step 2) (see FIG. 1). However, with respect to the metal oxide-silica composite aerogel prepared by the above preparation method using the oven drying, since the drying slowly proceeds from a surface of the metal oxide-silica composite wet gel by heat conduction during the oven drying, heat transfer to the inside of the wet gel is delayed, and thus, the drying may non-uniformly occur. Accordingly, overall drying time is increased to generate a severe pore shrinkage phenomenon due to surface tension of a solvent in the wet gel, and, as a result, since a specific surface area and a pore volume of the prepared metal oxide-silica composite aerogel are significantly reduced, the metal oxide-silica composite aerogel may have physical properties unsuitable for industrial applications. Also, the step of washing the wet gel with an organic solvent having a low surface tension before the drying is performed to suppress the shrinkage phenomenon, but, since a shrinkage phenomenon suppression effect is limited, it is not suitable for the preparation of a metal oxide-silica composite aerogel having high specific surface area and high pore volume and economic efficiency may be reduced because a large amount of the organic solvent is required.

Thus, there is a need to develop a method which may prepare a metal oxide-silica composite aerogel having high specific surface area and high pore volume characteristics due to the fact that the shrinkage phenomenon during drying is effectively suppressed, while having good economic efficiency because the large amount of the organic solvent is not required.

DISCLOSURE OF THE INVENTION

Technical Problem

An aspect of the present invention provides a method of preparing a metal oxide-silica composite aerogel which may prepare a metal oxide-silica composite aerogel having a high specific surface area and excellent pore characteristics by suppressing a shrinkage phenomenon during drying while having good economic efficiency because a preparation process is relatively simple and preparation time is relatively short in comparison to the related art.

Another aspect of the present invention provides a metal oxide-silica composite aerogel prepared by the above preparation method.

Technical Solution

According to an aspect of the present invention, there is provided a method of preparing a metal oxide-silica composite aerogel including the steps of: adding a metal ion solution and an acid catalyst to a water glass solution and mixing together to prepare a metal oxide-silica composite wet gel (step 1); and spray drying the metal oxide-silica composite wet gel (step 2), wherein the spray drying is performed by injecting dry gas into a drying chamber and spraying and hot air drying the metal oxide-silica composite wet gel, and the spraying is performed at a rate of 0.13 l/hr to 0.195 l/h.

According to another aspect of the present invention, there is provided a metal oxide-silica composite aerogel prepared by the above method.

Advantageous Effects

A method of preparing a metal oxide-silica composite aerogel according to the present invention may not only have good economic efficiency because production costs are relatively reduced in comparison to the related art, but may also effectively prevent the collapse of a pore structure by suppressing a shrinkage phenomenon during drying.

Thus, a metal oxide-silica composite aerogel prepared by the above preparation method may have higher specific surface area and better pore characteristics than a conventional metal oxide-silica composite aerogel prepared by oven drying while having low tap density.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The present invention provides a method of preparing a metal oxide-silica composite aerogel.

Figure 1:
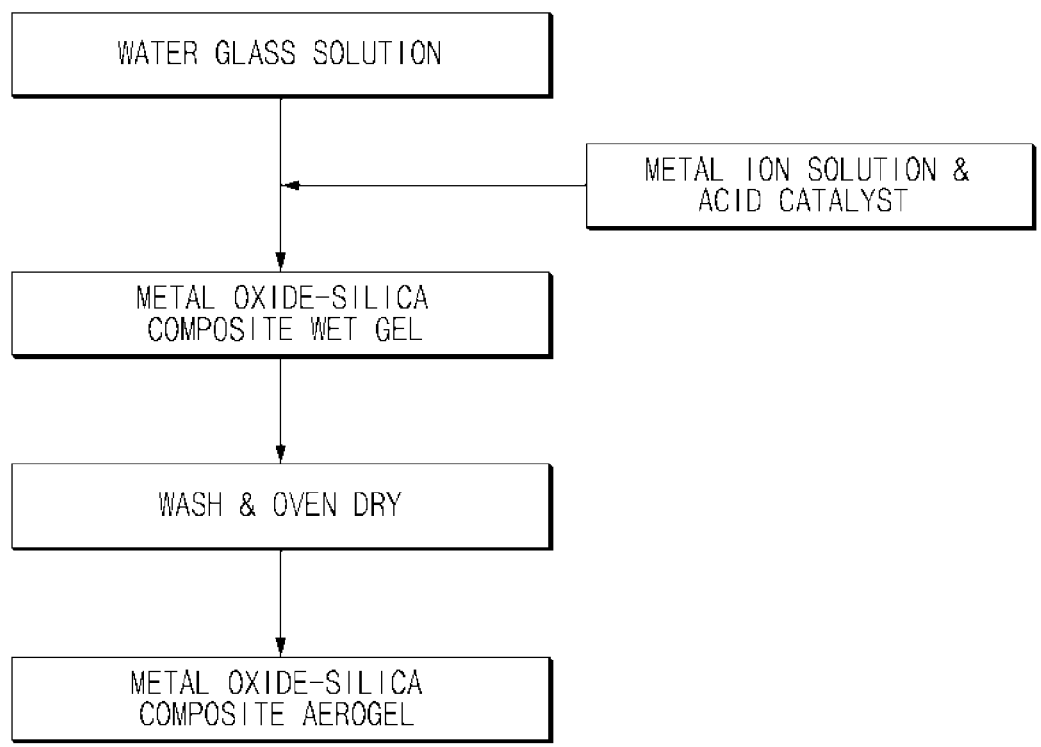
FIG. 1 schematically illustrates a flowchart of a conventional general method of preparing a metal oxide-silica composite aerogel.

In general, a metal oxide-silica composite aerogel is being prepared by the steps of: adding a metal ion solution and an acid catalyst to a water glass solution and performing a reaction to prepare a metal oxide-silica composite wet gel (step 1); and washing and oven drying the wet gel (step 2) (see FIG. 1). However, since a network structure of the metal oxide-silica composite aerogel prepared by the above method using the oven drying is collapsed by a severe shrinkage phenomenon occurred during the drying, pore characteristics, such as a specific surface area and a pore volume, are degraded, and thus, the metal oxide-silica composite aerogel may be unsuitable for industrial applications. Also, the step of washing the wet gel with an organic solvent with a relatively low surface tension is performed before the drying to suppress the shrinkage phenomenon, but, since a shrinkage phenomenon suppression effect is limited, it is not suitable for the preparation of a metal oxide-silica composite aerogel having high specific surface area and high pore volume and economic efficiency may be reduced because a large amount of the organic solvent is required.

Thus, the present invention provides a method of preparing a metal oxide-silica composite aerogel which may effectively prevent the collapse of pore structure by suppressing the shrinkage phenomenon during the drying.

Hereinafter, a method of preparing a metal oxide-silica composite aerogel according to an embodiment of the present invention will be described in detail with reference to FIG. 2.

Figure 2:
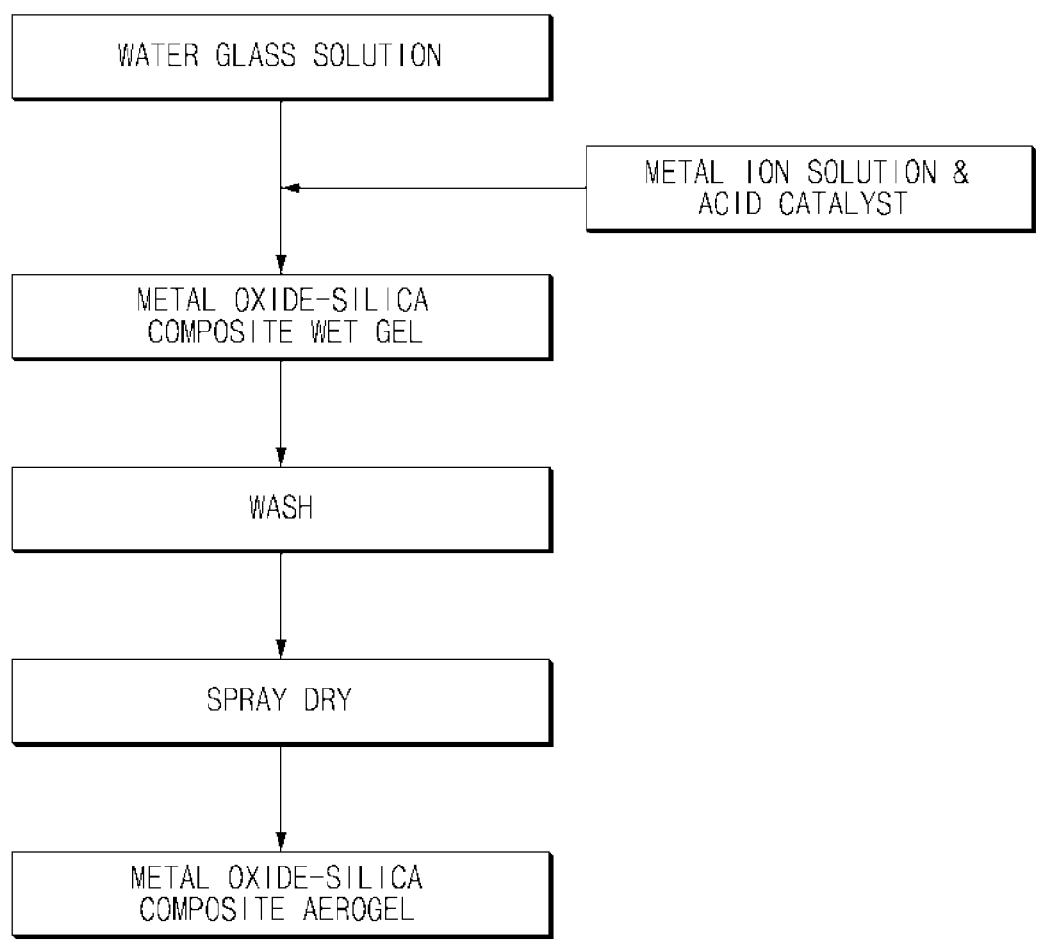
FIG. 2 schematically illustrates a flowchart of a method of preparing a metal oxide-silica composite aerogel according to an embodiment of the present invention.

FIG. 2 schematically illustrates a flowchart of the method of preparing a metal oxide-silica composite aerogel according to the embodiment of the present invention.

The method of preparing a metal oxide-silica composite aerogel according to the embodiment of the present invention includes the steps of: adding a metal ion solution and an acid catalyst to a water glass solution and mixing together to prepare a metal oxide-silica composite wet gel (step 1); and spray drying the metal oxide-silica composite wet gel (step 2).

Also, the spray drying is performed by injecting dry gas into a drying chamber and spraying and hot air drying the metal oxide-silica composite wet gel, wherein the spraying is performed at a rate of 0.13 l/hr to 0.195 l/h.

Furthermore, the preparation method according to the embodiment of the present invention may further include a step of washing before the drying of step 2, and the washing may be performed by using distilled water or alcohol.

Step 1 is a step for preparing a metal oxide-silica composite wet gel by reacting a water glass solution with a metal ion solution, and may be performed by adding the metal ion solution and an acid catalyst to the water glass solution and mixing together.

In this case, the metal ion solution and the acid catalyst may be simultaneously added to the water glass solution, or the metal ion solution is added to the water glass solution and mixed and the acid catalyst may then be sequentially added and mixed.

The mixing is not particularly limited, but, for example, may be performed by stirring, and the stirring may be performed at 300 rpm to 500 rpm for 1 hour to 3 hours using a magnetic bar.

The water glass solution may be a dilute solution, in which distilled water is added to water glass and mixed, and the water glass may be sodium silicate ($Na_2SiO_3$) as an alkali silicate salt obtained by melting silicon dioxide ($SiO_2$) and alkali. A concentration of water glass in the water glass solution may be in a range of 0.025 M to 3.0 M. That is, the water glass solution may contain 0.025 M to 3.0 M of the water glass. In a case in which the water glass concentration is less than 0.025 M, a structure of the aerogel may not be properly formed, and, even if the aerogel is formed, since the structure is collapsed while the aerogel does not withstand the shrinkage phenomenon occurred during the drying, physical properties may be significantly deteriorated. Also, in a case in which the water glass concentration is greater than 3.0 M, since density of the aerogel structure is high, the shrinkage phenomenon occurred during the drying may be reduced, and thus, limitations due to the structural collapse may be mitigated, but specific surface area characteristics may be degraded.

The metal ion solution may be prepared by dissolving a metal compound in a solvent, and a concentration of metal ions in the metal ion solution may be in a range of 0.0083 M to 1.0 M. Specifically, the metal ion solution may be a binary metal ion solution including calcium ions ($Ca^{2+}$) and magnesium ions ($Mg^{2+}$), and, in this case, a molar ratio of the calcium ion ($Ca^{2+}$) to the magnesium ion ($Mg^{2+}$) may be in a range of 1:2 to 1:10. That is, the metal ion solution may be one which is prepared by dissolving a calcium compound and a magnesium compound in the solvent, and the calcium compound and the magnesium compound may be calcium chloride and magnesium chloride, or a hydrate of the calcium chloride and a hydrate of the magnesium chloride, respectively. Specifically, the calcium compound may be calcium chloride dihydrate ($CaCl_2.2H_2O$), and the magnesium compound may be magnesium chloride hexahydrate ($MgCl_2.6H_2O$). Also, the solvent is not particularly limited as long as it may sufficiently dissolve the calcium compound and the magnesium compound, but, for example, may be distilled water.

Furthermore, the metal ion solution may be added in an amount such that the metal ions in the solution and the water glass in the water glass solution may be easily reacted, and, specifically, the metal ion solution may be added in an amount such that a molar ratio of the water glass contained in the water glass solution to the metal ions is in a range of 3:1 to 10:1.

The acid catalyst may function to allow the metal oxide-silica composite gel to be easily formed by promoting gelation of a metal oxide-silica composite sol which is formed by the reaction of the water glass in the water glass solution with the metal ions in the metal ion solution. Specifically, step 1 may be performed in a pH range of 7 to 8 so as to facilitate the gelation, and the pH may be adjusted by the acid catalyst. An amount of the acid catalyst used is not particularly limited, but the acid catalyst may be added in an amount such that the pH may be adjusted within the above range.

The acid catalyst is not particularly limited, but, for example, may be at least one selected from the group consisting of hydrochloric acid, nitric acid, acetic acid, sulfuric acid, and hydrofluoric acid.

Step 2 is a drying step for preparing a metal oxide-silica composite aerogel by drying the metal oxide-silica composite wet gel.

In this case, in the preparation method according to the embodiment of the present invention, a step of washing the metal oxide-silica composite wet gel may be further performed before the drying.

The washing is to obtain a high purity metal oxide-silica composite aerogel by removing impurities generated during the reaction, wherein the washing is not particularly limited and may be performed by a conventional method in the art.

For example, the washing may be performed by adding a washing solvent to the metal oxide-silica composite wet gel and stirring for 20 minutes to 1 hour. The washing solvent may be alcohol or distilled water.

The drying according to an embodiment of the present invention may be performed by spray drying.

The spray drying is performed by injecting dry gas into a drying chamber and spraying and hot air drying the metal oxide-silica composite wet gel, wherein powder having a uniform size may be obtained without a separate grinding process.

Specifically, the spray drying may be performed by spraying the metal oxide-silica composite wet gel into the drying chamber through a nozzle using a metering pump and hot air drying the metal oxide-silica composite wet gel by the injection of the dry gas into the drying chamber through a nozzle line separated from the metal oxide-silica composite wet gel. In this case, the hot air drying may be performed by contacting the sprayed metal oxide-silica composite wet gel with the heated dry gas. Also, the spraying is performed to allow the metal oxide-silica composite wet gel to be constantly injected at a rate of 0.13 l/hr to 0.195 l/h into the drying chamber through the nozzle, and an internal temperature of the drying chamber may be maintained at 140° C. to 200° C., particularly, 180° C. to 200° C.

The dry gas may be one conventionally known in the art, and, for example, may be compressed air or nitrogen gas.

In the preparation method according to the embodiment of the present invention, since the metal oxide-silica composite wet gel is dried not by conventional atmospheric pressure drying but by the spray drying, a drying rate may be significantly improved to suppress the shrinkage phenomenon due to the surface tension of the solvent in the wet gel.

Also, the present invention provides a metal oxide-silica composite aerogel prepared by the above preparation method.

The aerogel according to an embodiment of the present invention may be one in which silica is doped with metal oxide, and the metal oxide may be a combination of magnesium oxide (MgO) and calcium oxide (CaO). That is, the aerogel may include magnesium oxide (MgO), calcium oxide (CaO), and silica ($SiO_2$).

Herein, the doping denotes that a limited amount of a foreign material is added to a pure material, and, for example, may denote that the metal oxide is bonded in a network structure of the silica.

The aerogel according to the embodiment of the present invention may have a specific surface area of 100 $m^2/g$ to 450 $m^2/g$.

Also, the metal oxide-silica composite aerogel may have a tap density of 0.08 g/ml to 0.13 g/ml, a pore volume of 0.30 $cm^3/g$ to 1.0 $cm^3/g$, and an average particle diameter ($D_{50}$) of 6 μm to 12 μm.

Hereinafter, the present invention will be described in more detail, according to the following examples and experimental examples. However, the following examples and experimental examples are merely presented to exemplify the present invention, and the scope of the present invention is not limited thereto.

Example 1

A metal oxide-silica composite aerogel was prepared through steps illustrated in FIG. 2.

Specifically, a metal ion solution (metal ion concentration 0.33 M, $Mg^{2+}$:$Ca^{2+}$=2:1 molar ratio) was added to a water glass solution (water glass concentration 1.0 M), hydrochloric acid was added until a pH of 7 was reached, and stirring was then performed for 60 minutes to prepare a metal oxide-silica composite wet gel. In this case, the metal ion solution was added such that an amount of metal ions in the metal ion solution was ⅓ mol based on water glass (1 mol) in the water glass solution. The prepared wet gel was washed three times with distilled water and spray-dried to prepare a metal oxide-silica composite aerogel in a powder state. In this case, the spray drying was performed by spraying the metal oxide-silica composite wet gel at 0.13 l/h using a spray drier B-290 (BUCHI Corporation) while maintaining an internal temperature of a drying chamber at 180° C., and compressed air, as dry gas, was injected into the drying chamber.

Example 2

A metal oxide-silica composite aerogel in a powder state was prepared in the same manner as in Example 1 except that a metal oxide-silica composite wet gel was sprayed at 0.195 l/h during spray drying.

Example 3

A metal oxide-silica composite aerogel in a powder state was prepared in the same manner as in Example 1 except that a water glass solution having a water glass concentration of 2.0 M was used.

Comparative Example 1

A metal oxide-silica composite aerogel was prepared through steps illustrated in FIG. 1.

Specifically, a metal ion solution (metal ion concentration 0.33 M, $Mg^{2+}:Ca^{2+}=2:1$ molar ratio) was added to a water glass solution (water glass concentration 1.0 M), hydrochloric acid was added until a pH of 7 was reached, and stirring was then performed for 60 minutes to prepare a metal oxide-silica composite wet gel. In this case, the metal ion solution was added such that an amount of metal ions in the metal ion solution was ⅓ mol based on water glass (1 mol) in the water glass solution. The prepared wet gel was washed three times with distilled water and dried at atmospheric pressure in an oven at 150° C. for 2 hours to prepare a metal oxide-silica composite aerogel in a powder state.

Comparative Example 2

A metal oxide-silica composite aerogel in a powder state was prepared in the same manner as in Comparative Example 1 except that a water glass solution having a water glass concentration of 2.0 M was used.

Comparative Example 3

A metal oxide-silica composite aerogel in a powder state was prepared in the same manner as in Example 1 except that a metal oxide-silica composite wet gel was sprayed at 0.1 l/h during spray drying.

Comparative Example 4

A metal oxide-silica composite aerogel in a powder state was prepared in the same manner as in Example 2 except that a metal oxide-silica composite wet gel was sprayed at 0.23 l/h during spray drying.

Experimental Example

In order to compare physical properties of the metal oxide-silica composite aerogels prepared in Examples 1 to 3 and Comparative Examples 1 to 4, tap density (g/ml), specific surface area (Brunauer-Emmett-Teller (BET), $m^2/g$), particle diameter, and pore characteristics (pore volume and pore diameter) of each aerogel were measured. The results thereof are presented in Table 1 below.

(1) Tap Density (g/ml)

Tap density was measured using a tap density tester (STAV II, J. Engelsmann AG).

(2) Specific Surface Area (BET, $m^2/g$) and Pore Characteristics

A specific surface area was measured based on the amounts of nitrogen, which were adsorbed and desorbed according to partial pressure ($0.11<p/p_o<1$), using a 3 FLEX analyzer (Micromeritics).

(3) Particle Diameter

A particle diameter was measured by a dry method using a S3500 analyzer (Microtrac).

TABLE 1

| Category | Tap density (g/ml) | Specific surface area ($m^2/g$) | Pore volume ($cm^3/g$) | Pore diameter (nm) | Particle diameter ($D_{50}$, μm) |
| --- | --- | --- | --- | --- | --- |
| Example 1 | 0.11 | 350 | 0.45 | 13.2 | 6.45 |
| Example 2 | 0.12 | 330 | 0.41 | 13.1 | 6.78 |
| Example 3 | 0.08 | 250 | 0.32 | 9.9 | 6.89 |
| Comparative Example 1 | 0.24 | 200 | 0.30 | 10.1 | 13.02 |
| Comparative Example 2 | 0.20 | 150 | 0.21 | 7.3 | 17.49 |
| Comparative Example 3 | 0.18 | 210 | 0.31 | 18.1 | 8.01 |
| Comparative Example 4 | 0.25 | 180 | 0.23 | 9.1 | 9.89 |

As illustrated in Table 1, it was confirmed that the metal oxide-silica composite aerogels of Examples 1 to 3 according to the embodiment of the present invention had uniform particle diameters and excellent pore characteristics and specific surface areas while having overall reduced tap densities in comparison to the metal oxide-silica composite aerogels of Comparative Examples 1 to 4.

Specifically, as a result of comparing the metal oxide-silica composite aerogel of Example 1 with the metal oxide-silica composite aerogel of Comparative Example 1 and comparing the metal oxide-silica composite aerogel of Example 3 with the metal oxide-silica composite aerogel of Comparative Example 2, which were prepared under the same condition except that drying conditions were different, it was confirmed that, with respect to the metal oxide-silica composite aerogels of Examples 1 and 3, the tap densities were respectively decreased to levels of about 46% and about 44% and the specific surface areas were respectively improved to levels of 175% and 167% in comparison to the metal oxide-silica composite aerogels of Comparative Examples 1 and 2. The result indicated that the pore shrinkage phenomenon during the drying may be suppressed when the drying was performed by the spray drying according to the preparation method of the present invention, and thus, the collapse of the pore structure may be effectively prevented.

Also, as a result of comparing the metal oxide-silica composite aerogel of Example 1 with the metal oxide-silica composite aerogel of Comparative Example 3 and comparing the metal oxide-silica composite aerogel of Example 2 with the metal oxide-silica composite aerogel of Comparative Example 4, which were prepared in the same manner except that a condition (spray rate) during the spray drying was different, it was confirmed that, with respect to the metal oxide-silica composite aerogels of Examples 1 and 2, the specific surface areas were significantly increased to levels of about 167% and about 183%, respectively, while the tap densities were respectively decreased to levels of about 61% and about 48% in comparison to the metal oxide-silica composite aerogels of Comparative Examples 3 and 4. The result indicated that the condition during the spray drying, for example, the spray rate of the metal oxide-silica composite wet gel to be dried, may affect the suppression of the pore shrinkage phenomenon and the spray rate condition according to the present invention may be effective in the preparation of a metal oxide-silica composite aerogel having desired physical properties.

The invention claimed is:

1. A method of preparing a metal oxide-silica composite aerogel, the method comprising steps of:
   (1) adding with mixing a metal ion solution to a water glass solution containing a concentration of water glass in a range of 0.025 M to 3.0 M and adding to the solution with mixing an acid catalyst until a pH of 7 to 8 is reached, and allowing the mixture to react to prepare a metal oxide-silica composite wet gel; and
   (2) spray drying the metal oxide-silica composite wet gel, wherein the spray drying is performed by injecting dry gas into a drying chamber and spraying and hot air drying the metal oxide-silica composite wet gel, and the spraying is performed at a rate of 0.13 1/hr to 0.195 1/hr.

2. The method of claim 1, wherein a concentration of metal ions in the metal ion solution is in a range of 0.0083 M to 1.0 M.

3. The method of claim 1, wherein the metal ion solution is a binary metal ion solution including calcium ions ($Ca^{2+}$) and magnesium ions ($Mg^{2+}$).

4. The method of claim 3, wherein a molar ratio of the calcium ion ($Ca^{2+}$) to the magnesium ion (Mg') in the metal ion solution is in a range of 1:2 to 1:10.

5. The method of claim 1, wherein the metal ion solution is added in an amount such that a molar ratio of water glass in the water glass solution to metal ions is in a range of 3:1 to 10:1.

6. The method of claim 1, wherein the acid catalyst comprises at least one selected from the group consisting of hydrochloric acid, nitric acid, acetic acid, sulfuric acid, and hydrofluoric acid.

7. The method of claim 1, further comprising washing before the drying of step (2).

8. The method of claim 1, wherein an internal temperature of the drying chamber is in a range of 140° C. to 200° C.

9. The method of claim 1, wherein the hot air drying is performed by contacting the sprayed metal oxide-silica composite wet gel with the heated dry gas.

* * * * *

UNITED STATES PATENT AND TRADEMARK OFFICE
CERTIFICATE OF CORRECTION

PATENT NO. : 10,710,884 B2
APPLICATION NO. : 15/743631
DATED : July 14, 2020
INVENTOR(S) : Kang et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 174 days.

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*